(12) United States Patent
Chen et al.

(10) Patent No.: US 9,311,511 B2
(45) Date of Patent: Apr. 12, 2016

(54) ELECTRONIC DEVICE OF BOARD PROTECTION MECHANISM

(71) Applicant: UNIFORM INDUSTRIAL CORP., New Taipei (TW)

(72) Inventors: Yu-Tsung Chen, New Taipei (TW); Shu-Hua Chiang, New Taipei (TW)

(73) Assignee: UNIFORM INDUSTRIAL CORP., New Taipei (TW)

( * ) Notice: Subject to any disclaimer, the term of this patent is extended or adjusted under 35 U.S.C. 154(b) by 0 days.

(21) Appl. No.: 14/533,642

(22) Filed: Nov. 5, 2014

(65) Prior Publication Data

US 2016/0026828 A1 Jan. 28, 2016

(30) Foreign Application Priority Data

Jul. 25, 2014 (TW) .............................. 103213308 U

(51) Int. Cl.
*G06F 1/26* (2006.01)
*G06F 21/86* (2013.01)
*G06F 21/88* (2013.01)

(52) U.S. Cl.
CPC ................ *G06F 21/86* (2013.01); *G06F 21/88* (2013.01)

(58) Field of Classification Search
CPC ................................ G06F 21/86; G06F 21/88
USPC ........................................................... 726/34
See application file for complete search history.

(56) References Cited

U.S. PATENT DOCUMENTS

| | | | | |
|---|---|---|---|---|
| 7,597,261 B2* | 10/2009 | Aviv | .................... | G06K 7/0091 235/439 |
| 7,880,248 B1* | 2/2011 | Pham | .................... | H01L 23/573 257/417 |
| 7,998,413 B2* | 8/2011 | Fukushima | .......... | G01N 21/553 385/12 |
| 2004/0120101 A1* | 6/2004 | Cohen | ................... | H01L 23/576 361/654 |

* cited by examiner

*Primary Examiner* — Teshome Hailu
(74) *Attorney, Agent, or Firm* — Muncy, Geissler, Olds & Lowe, P.C.

(57) ABSTRACT

An electronic device of a board protection mechanism includes: a substrate, a first shell, a first protection area, a second shell, a second protection area, and an adhesive piece, where the first protection area is located between a first surface of the substrate and the first shell and uses a structure between an operation board and the substrate for protection, the second shell is located at a second surface of the substrate and includes a groove and a feed inlet that are connected; the second protection area is located at the groove of the second shell and includes a wire mesh, surrounding the electronic element area and is electrically connected to the substrate; and the adhesive piece is filled into the feed inlet to cover the groove and fixed to the first shell, the second shell, the wire mesh, and the electronic element area.

20 Claims, 15 Drawing Sheets

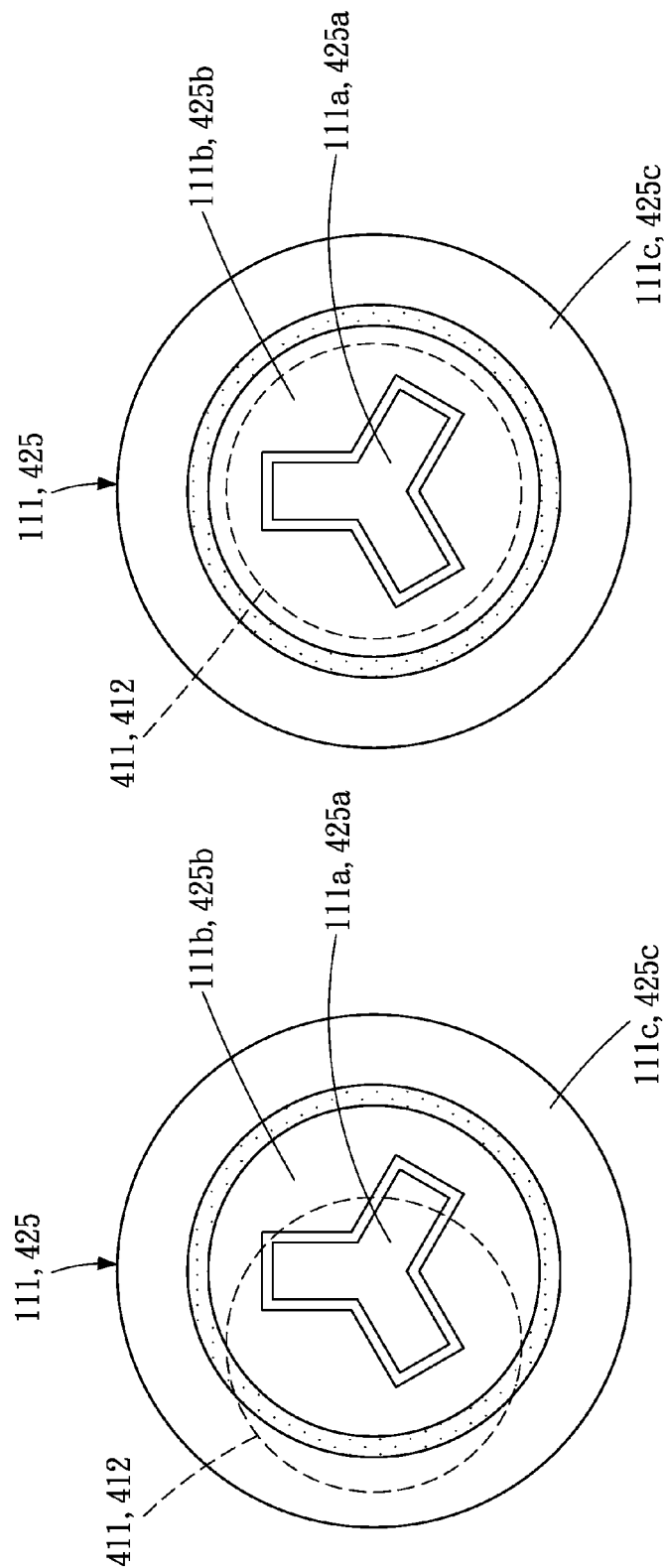

ELECTRONIC DEVICE OF BOARD PROTECTION MECHANISM

CROSS-REFERENCES TO RELATED APPLICATIONS

This non-provisional application claims priority under 35 U.S.C. §119(a) on Patent Application No. 103213308 filed in Taiwan, R.O.C. on Jul. 25, 2014, the entire contents of which are hereby incorporated by reference.

BACKGROUND

1. Technical Field

The present invention relates to an electronic device, and more particular, to an electronic device of a board protection mechanism.

2. Related Art

Currently, various card readers include a multifunction password keyboard and are applicable to fields of credit cards, access control cards, and the like. By using a credit card as an example, because a mechanism of payment after consumption is used for a credit card, the use of the credit card is convenient and quick. However, with the widespread of a credit card, personal credit information faces increasingly severe security problems, among which theft of credit card data and illegal card counterfeiting are the most common ones. Therefore, how to prevent theft of credit data and avoid capital losses and financial disorder is an issue requiring urgent solution for the public.

SUMMARY

In view of this, the present invention provides an electronic device of a board protection mechanism, including: a substrate, a first shell, a first protection area, a second shell, a second protection area, and an adhesive piece, where the second shell is located at a second surface of the substrate and is combined with the first shell, the second shell includes a groove and a feed inlet that are connected, where the groove corresponds to an electronic element area, and the feed inlet corresponds to an outer side of the electronic element area (that is, an outer side of a wire mesh of the second protection area); the second protection area is located at the groove of the second shell, the second protection area includes a wire mesh, surrounding the electronic element area and electrically connected to the substrate; and the adhesive piece is filled into a feed inlet to cover space between the second surface of the substrate and the groove, the adhesive piece is fixed to the first shell, the second shell, the wire mesh, and the electronic element area, and when the first shell or the second shell is intruded or damaged by an external force, the adhesive piece and the wire mesh are touched to drive a signal loop of a loop protection program to be broken or short-circuited.

Based on this, the starting a loop protection program is driving a microprocessor in the electronic device to stop running and clearing information in a memory.

Based on this, the starting a loop protection program is driving a microprocessor in the electronic device to stop running and clearing information in a memory.

In the present invention, by using a structural design of a board (that is, a structure of a single substrate), an adhesive piece and a wire mesh of a second protection area cover a rear end of a substrate, so as to achieve a difference from a problem of increased cost in using a double-layer board for a protective design and provide an effect of cost reduction. In addition, when an electronic device of a board protection mechanism is damaged by an improper external force, it can be ensured that data stored in the electronic device is not stolen.

Detailed description of the characteristics and the advantages of the present invention is shown in the following embodiments, the technical content and the implementation of the present invention should be readily apparent to any person skilled in the art from the detailed description, and the purposes and the advantages of the present invention should be readily understood by any person skilled in the art with reference to content, claims and drawings in the disclosure.

BRIEF DESCRIPTION OF THE DRAWINGS

The disclosure will become more fully understood from the detailed description given herein below for illustration only, and thus are not limitative of the disclosure, and wherein:

FIG. 9H is a schematic view (1) when a first contact point or a detection contact of the present invention is connected; and FIG. 9I is a schematic view (2) when a first contact point or a detection contact of the present invention is connected.

DETAILED DESCRIPTION

Figure 1:
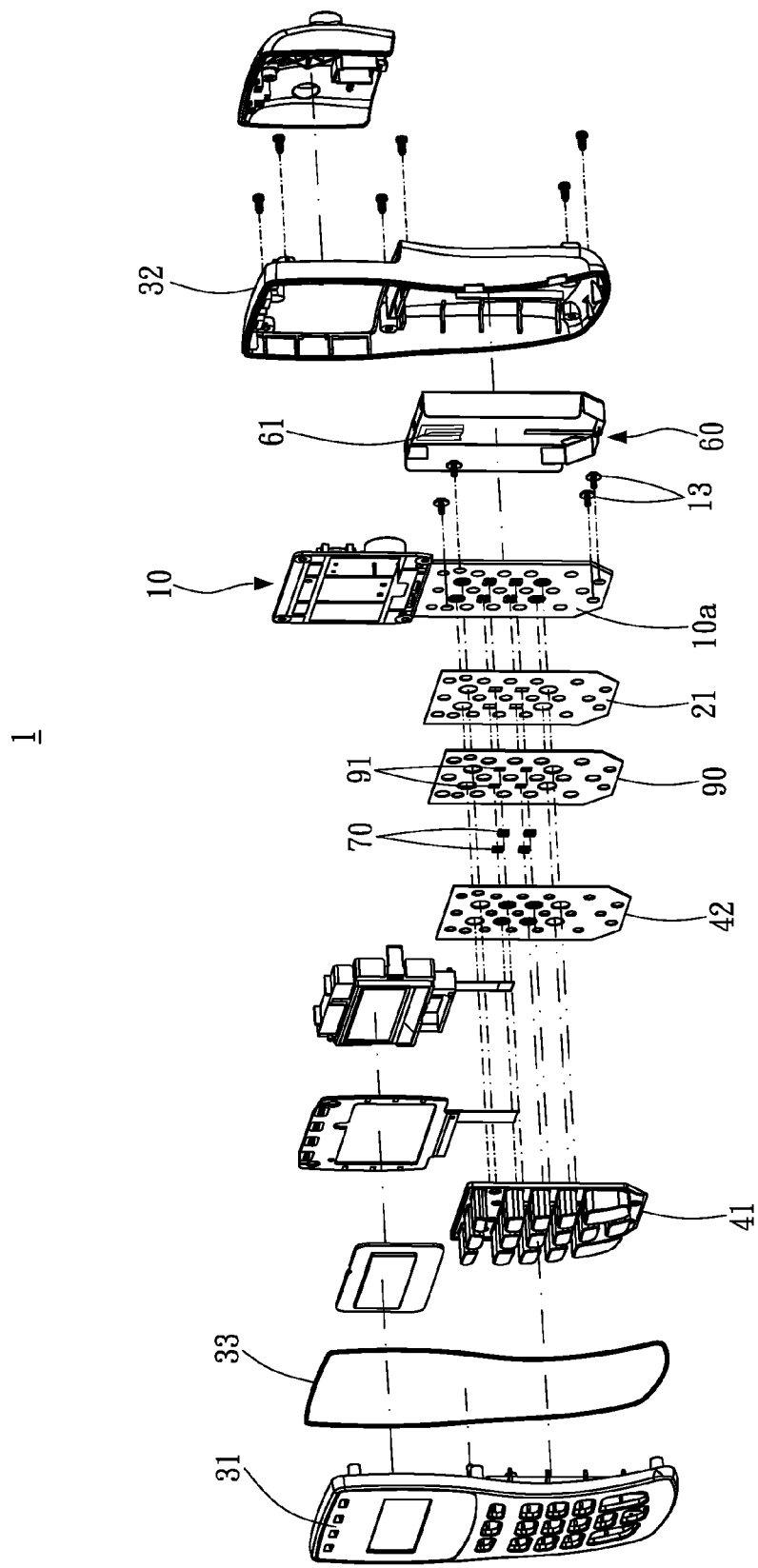
FIG. 1 is an exploded front view of the present invention.

Refer to FIGS. 1 to 7, which show a first embodiment of the present invention, and an electronic device 1 of a board protection mechanism is disclosed and includes a substrate 10, a first shell 31, a first protection area 40, a second shell 32, a second protection area 60, and an adhesive piece 80. In this embodiment, the adhesive piece 80 is fixedly adhered to the first shell 31, the second shell 32, the second protection area 60, and an electronic circuit element of a second surface 10b of the substrate 10.

Figure 3:
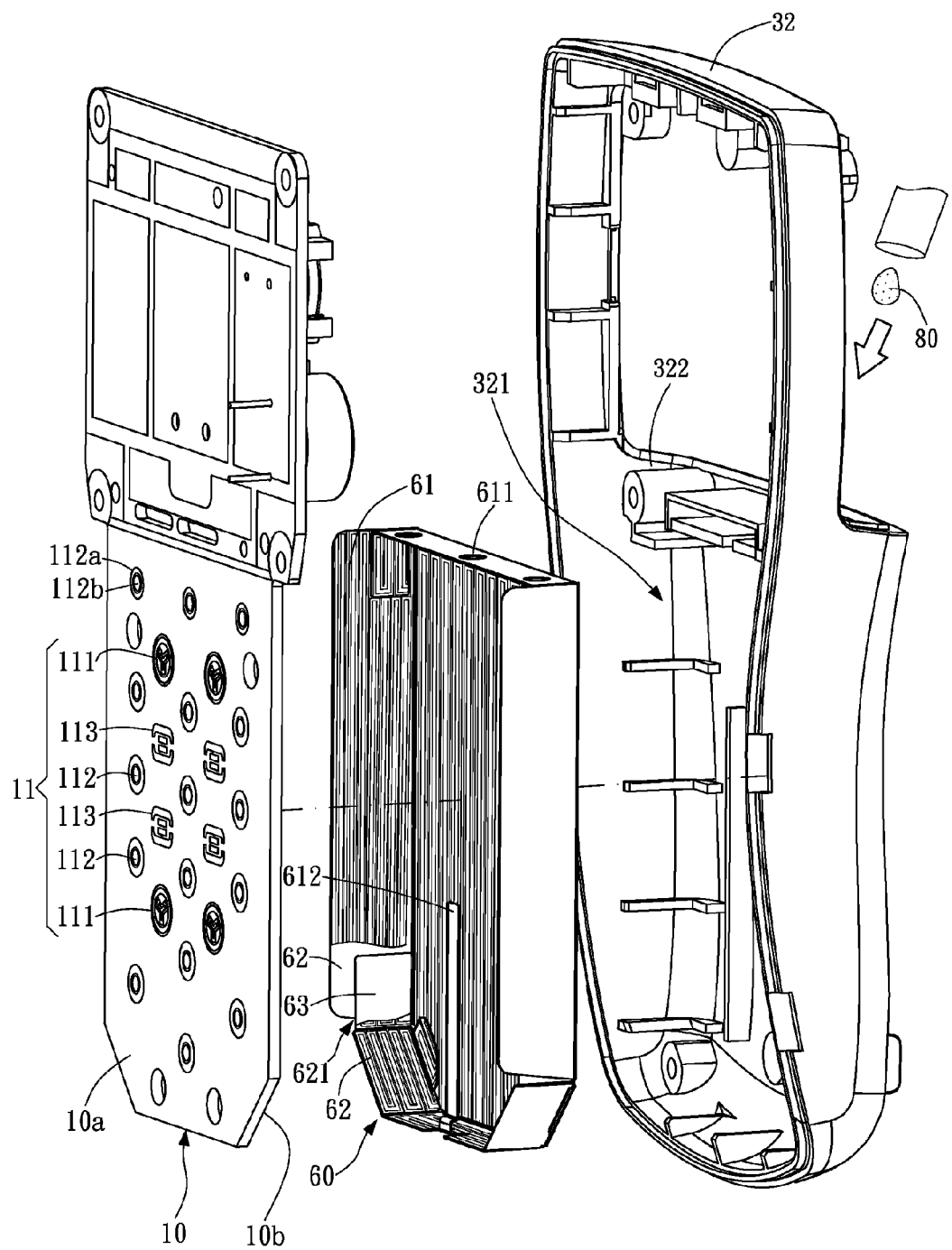
FIG. 3 is a partial enlarged front view (2) of the present invention.
Figure 6:
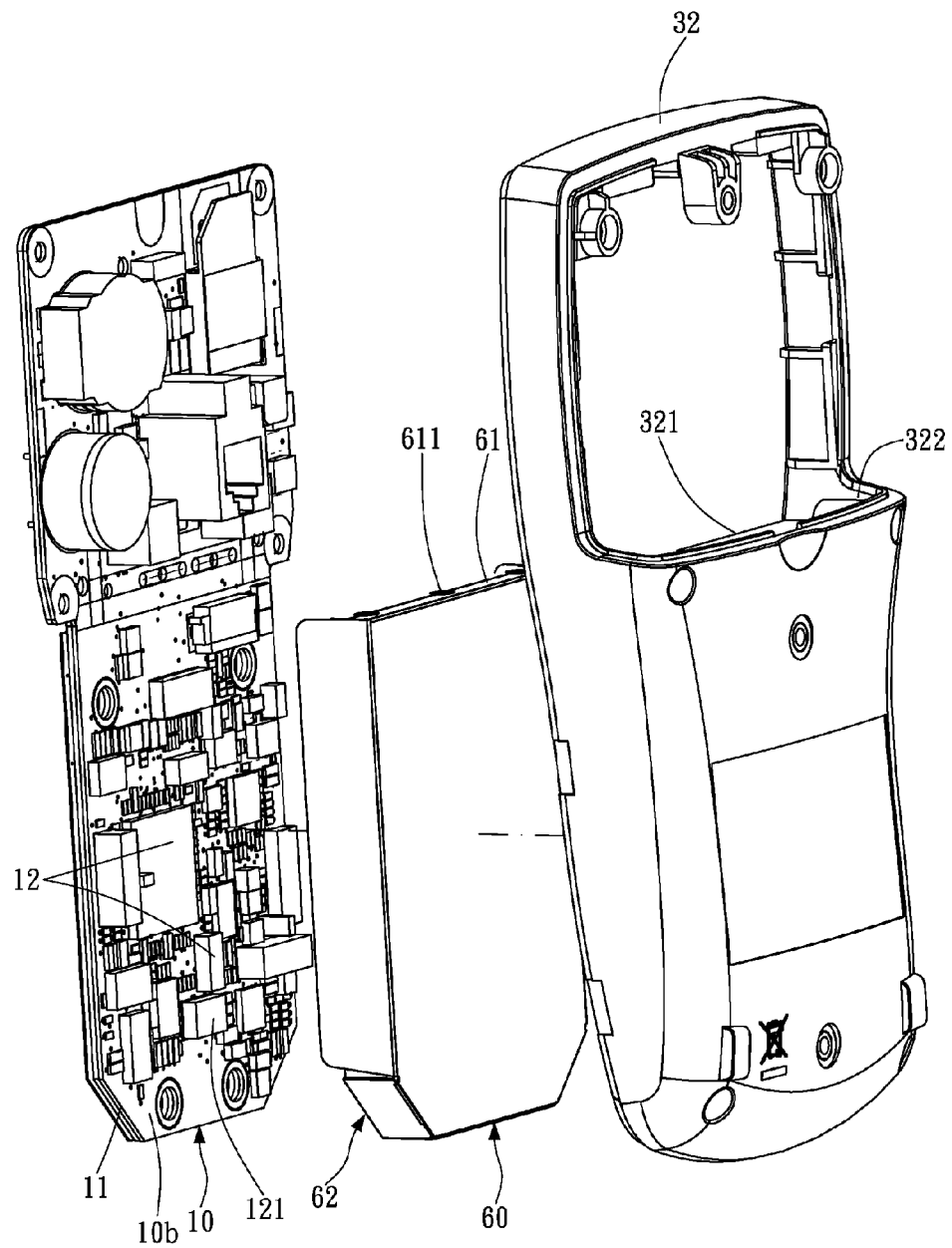
FIG. 6 is a partial enlarged rear view (2) of the present invention.
Figure 7:
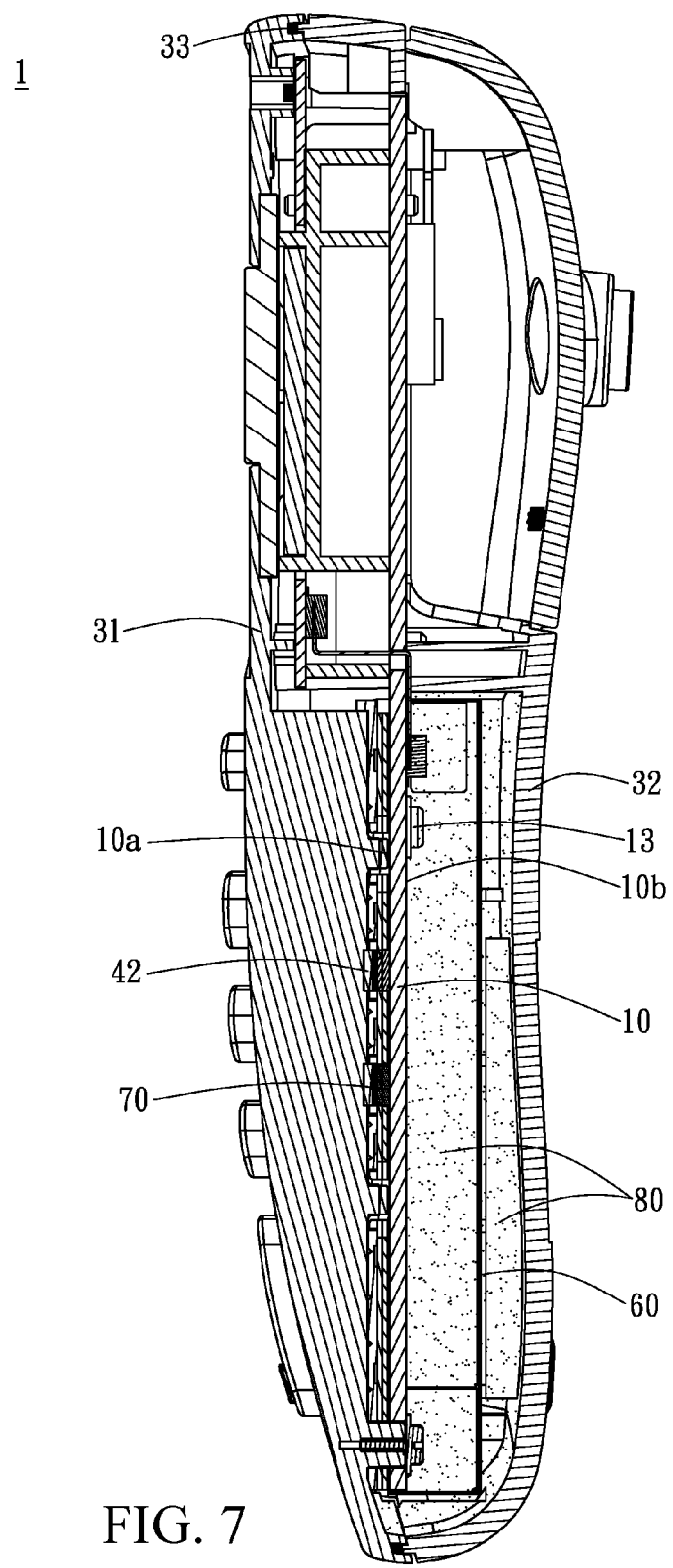
FIG. 7 is a cross-sectional side view of the present invention.
Figure 8:
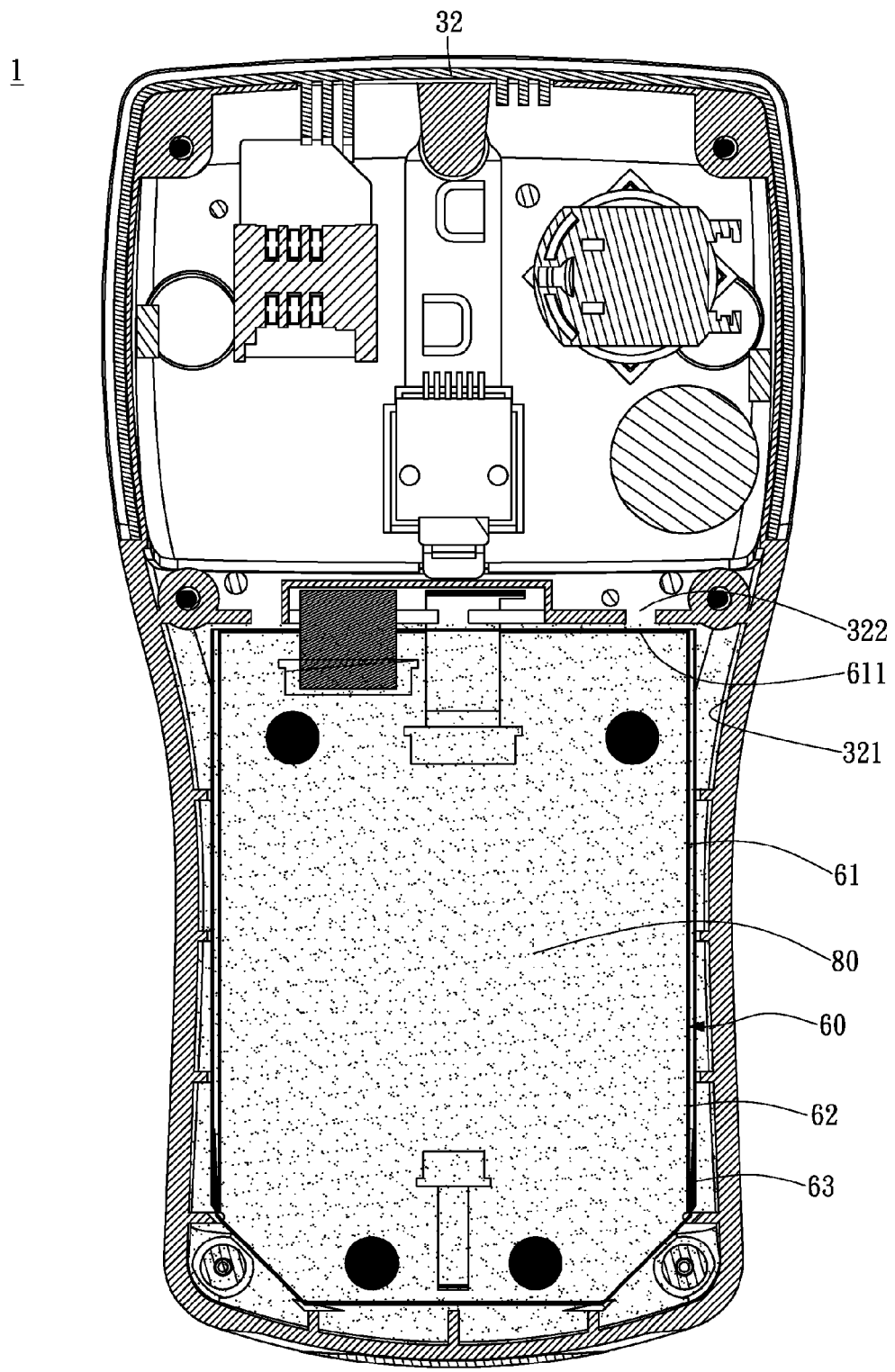
FIG. 8 is a cross-sectional front view of the present invention.

Referring to FIGS. 3 and 6, the substrate 10 is a multilayer circuit board, disposed with a plurality of winding circuits. The substrate 10 has a first surface 10a and a second surface 10b, where the first surface 10a has a substrate protection area 11, and the second surface 10b has an electronic element area 12. That is, the electronic element area 12 is disposed with a plurality of electronic circuit elements (such as a microprocessor, a memory, and a battery); herein, the electronic element area 12 has a connector 121.

Figure 2:
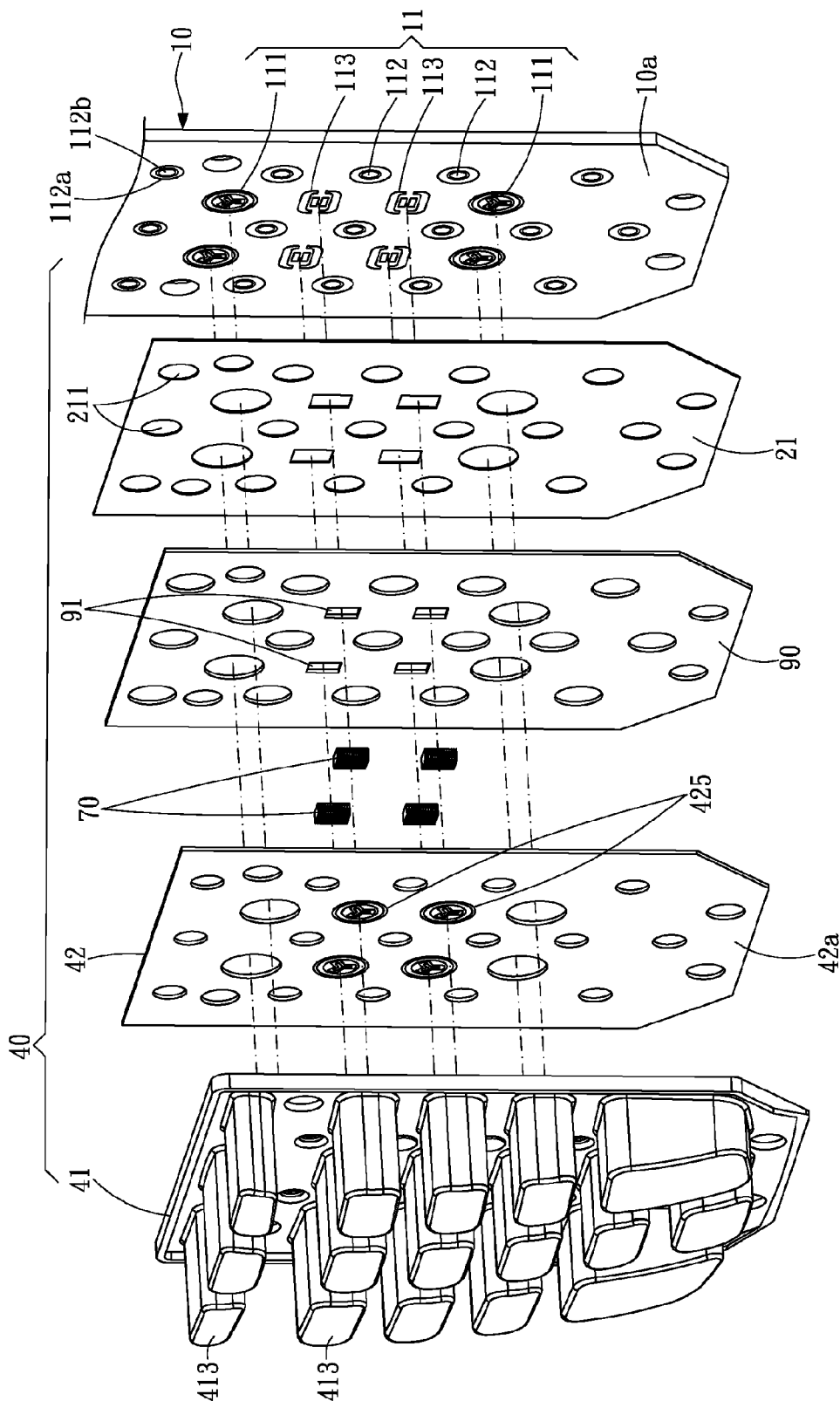
FIG. 2 is a partial enlarged front view (1) of the present invention.
Figure 9A:
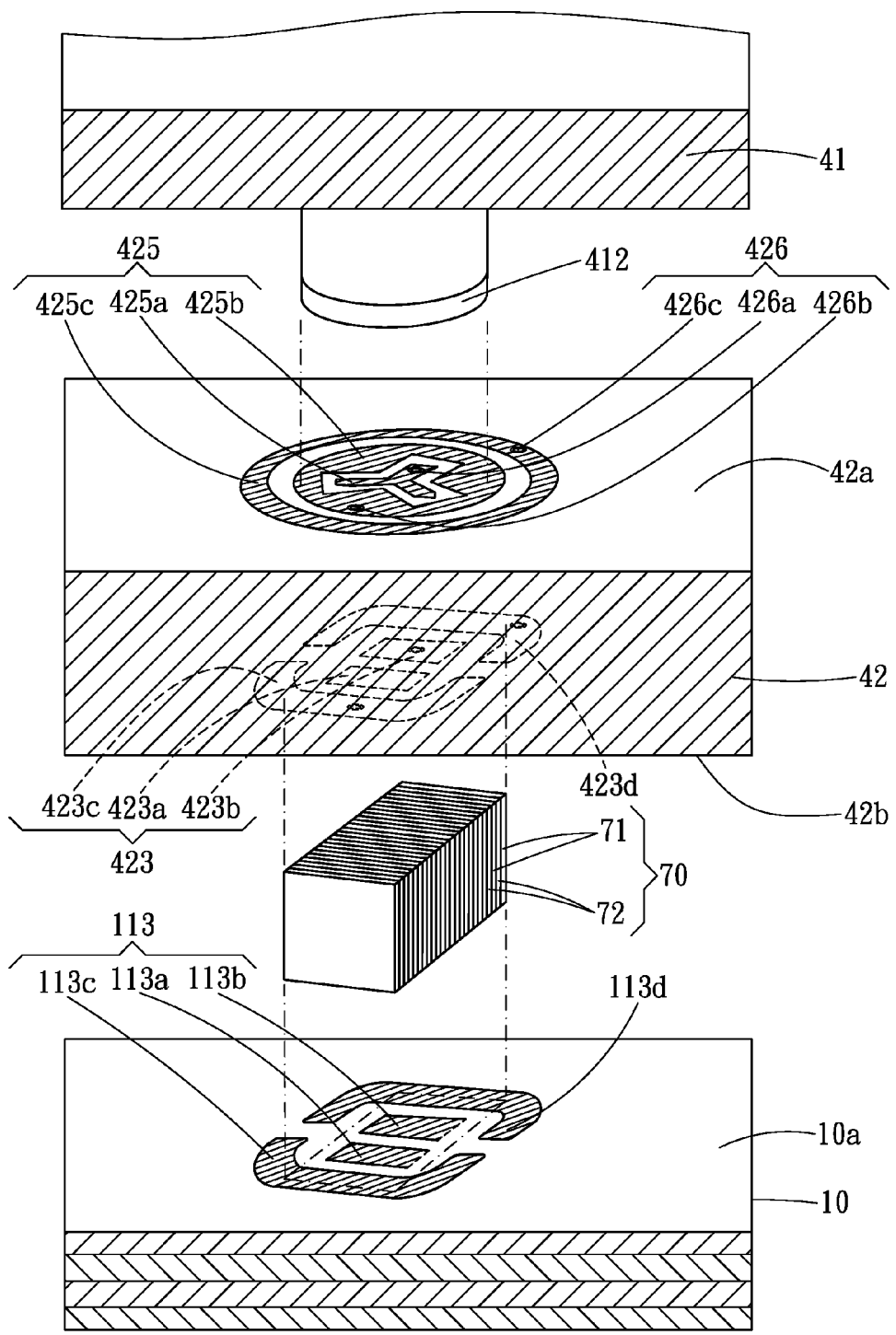
FIG. 9A is a perspective view of a partial assembly of the present invention.

Referring to FIGS. 2 and 9A, in this embodiment, the substrate protection area 11 has a first contact point 111, a second contact point 112, and a third contact point 113. The first contact point 111 is located around a key 413, and particularly, around a numeric key 413, so as to protect the key 413 from being intruded or lapped. The second contact point 112 is disposed in the substrate protection area 11 according to an arrangement manner of the key 413, the second contact point 112 has an outer guide point 112a and an inner guide point 112b separated from each other, the third contact point 113 is disposed between the first contact points 111, and a plurality of second contact points 112 is arranged between each first contact point 111 and each third contact point 113 in a staggered manner. When the key 413 of an operation board 41 is pressed, the other end of the key 413 passes through the mesh board 42 and becomes in contact with the second contact point 112 of the substrate 10, so as to generate a corresponding key signal.

Figure 5:
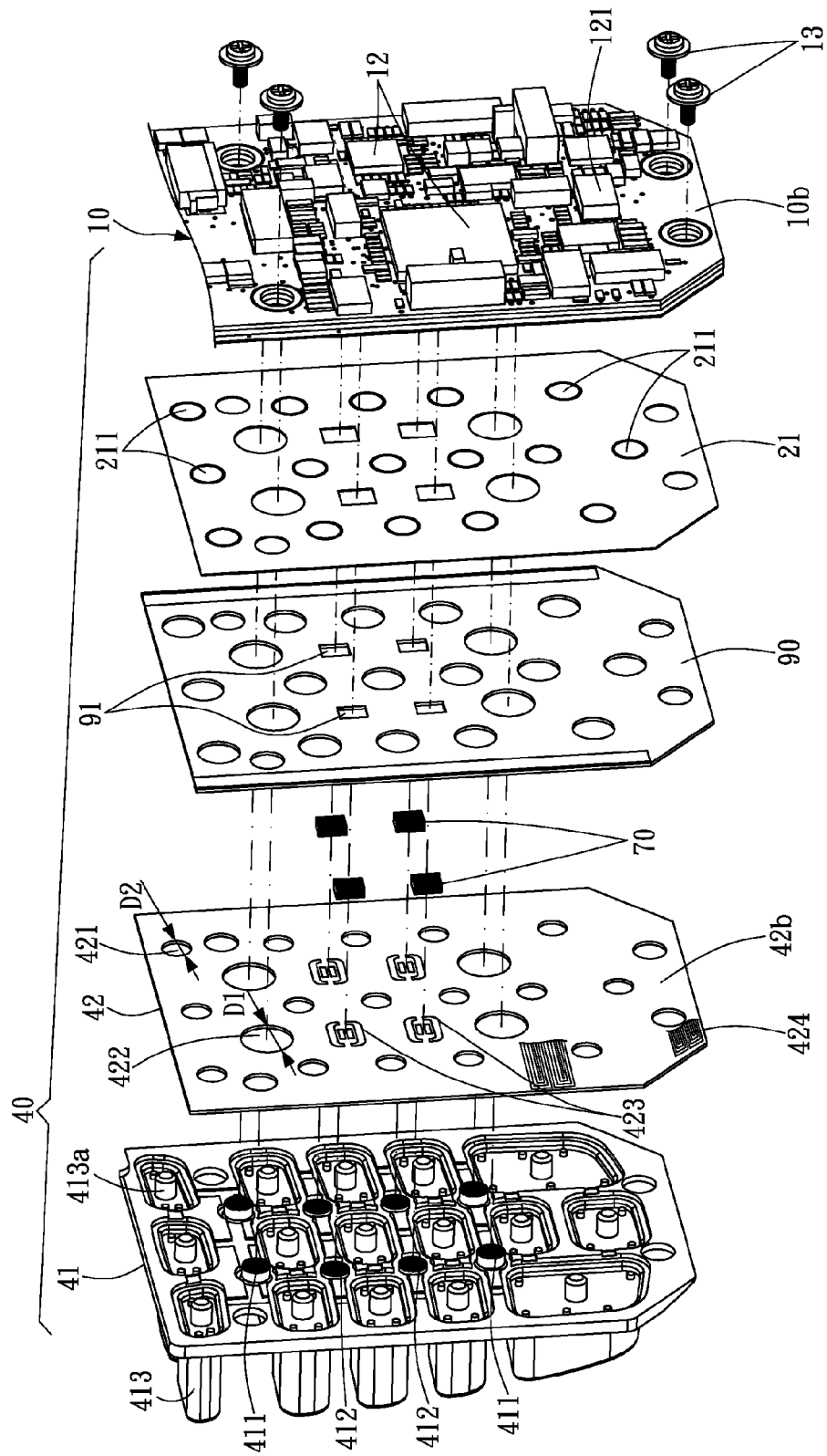
FIG. 5 is a partial enlarged rear view (1) of the present invention.

Referring to FIGS. 2 and 5, in this embodiment, the electronic device 1 of the board protection mechanism further has a key switch component 21, and the key switch component 21 is a thin plate located between a dividing sheet 90 and the substrate 10, where the key switch component 21 has a metal spring 211 being a semicircle spring, an outer edge of which is in contact with the outer guide point 112a of the second contact point 112, and the metal spring 211 corresponds to the key 413. When the key 413 is pressed, the metal spring 211 of the key switch component 21 is in contact with the second contact point 112, that is, an inner edge of the metal spring 211 is in contact with the inner guide point 112b of the second contact point 112, so that two endpoints of a loop of the outer guide point 112a and the inner guide point 112b are connected in a conduction manner to generate a corresponding key signal.

Referring to FIGS. 2, 9H, and 9I, the first contact point 111 includes a first induction point 111a, a second induction point 111b, and a third induction point 111c separated from each other, where the first induction point 111a and the second induction point 111b form two independent loops A and B (a positive signal and a negative signal), and the third induction point 111c forms a ground loop C (a ground signal). If the loop A or B is broken or the loops A and B are broken, or the loop C and the loop A or B are short-circuited, the microprocessor is driven to stop running of a whole module and clear information records in a memory.

Figure 9B:
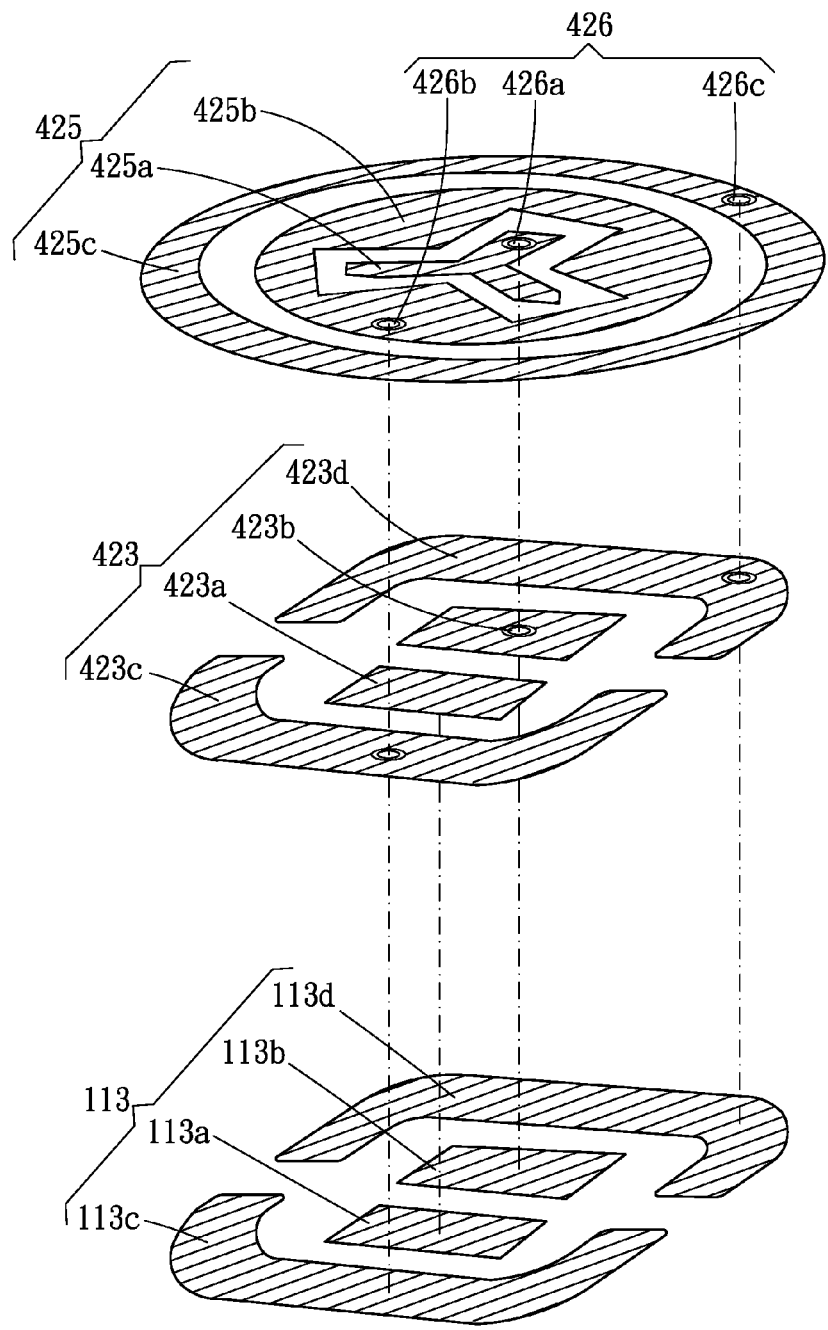
FIG. 9B is a connection view corresponding to a loop in FIG. 9A.
Figure 9C:
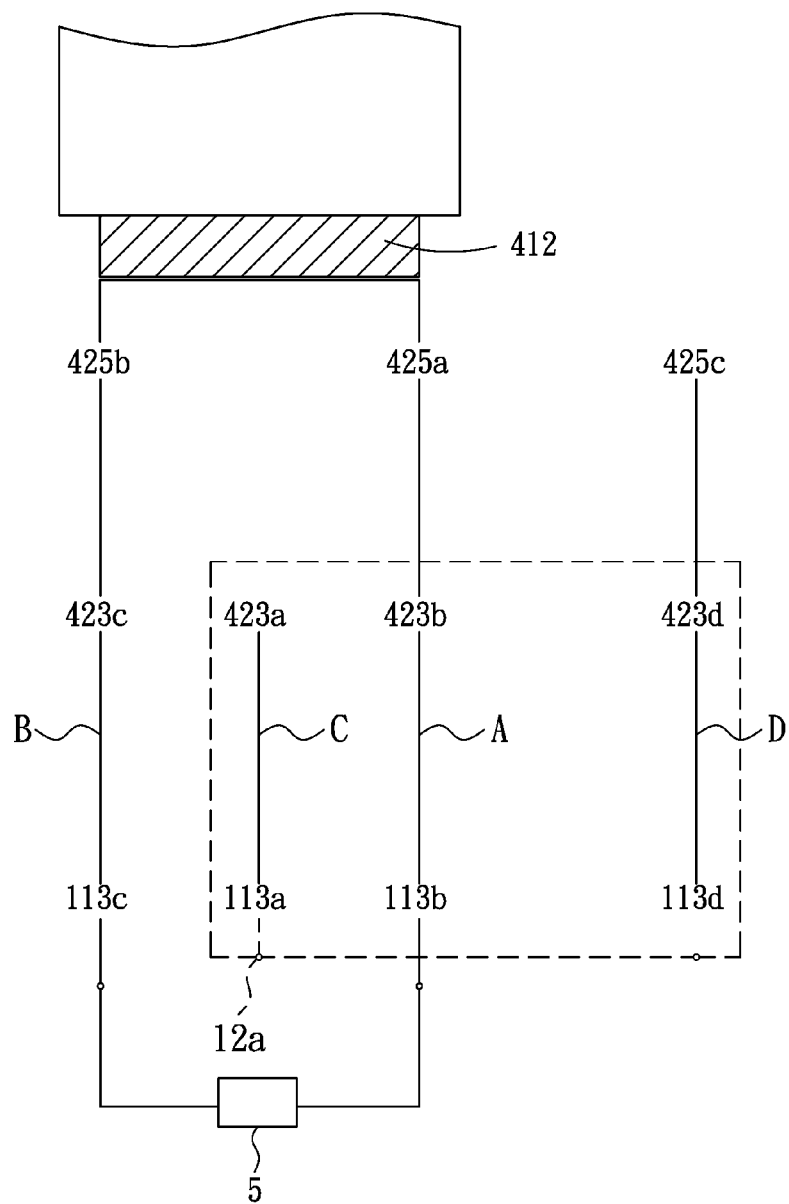
FIG. 9C is a schematic view of a loop architecture of the present invention.
Figure 9D:
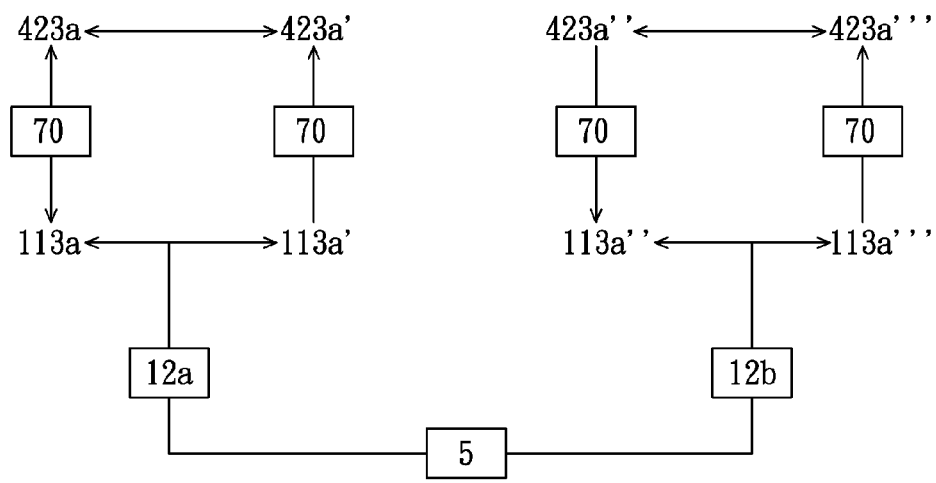
FIG. 9D is a schematic view of a loop connection aspect of the present invention.

Referring to FIGS. 9A, 9B, and 9C, the third contact point 113 has a plurality of first connection points 113a, second connection points 113b, third connection points 113c, and first ground connection points 113d.

A first contact 425a is connected to a fifth connection point 423b, and a second connection point 113b is connected to the fifth connection point 423b of the mesh board 42 by using a conduction element 70, so as to form a first loop A. In addition, the second connection point 113b is connected to a microprocessor 5.

A second contact 425b is connected to a sixth connection point 423c, and a third connection point 113c is connected to the sixth connection point 423c of the mesh board 42 by using the conduction element 70, so as to form a first loop B. In addition, the third connection point 113c is connected to the microprocessor 5.

The first connection point 113a is connected to a fourth connection point 423a of the mesh board 42 by using the conduction element 70, so as to form a first loop C. In addition, the first connection point 113a is connected to an internal detection point 12a.

A third contact 425c is connected to a second ground connection point 423d, and a first ground connection point 113d is connected to the second ground connection point 423d of the mesh board 42 by using the conduction element 70, so as to form another signal polar D. In addition, the microprocessor 5 can detect whether the first contact 425a or the second contact 425b is short-circuited with the third contact 425c. When the third contact 425c is short-circuited with the first contact 425a and the second contact 425b, the microprocessor is driven to stop running of a whole module and clear information records in the memory.

In this embodiment, A and B are a same loop, and C and the signal polar D are independent from each other.

In this embodiment, if the loop A or B is broken or the loops A and B are broken, or the loop C is broken, or the signal polar D and the loop A or B is short-circuited, the microprocessor is driven to stop running of a whole module and clear information records in the memory.

Referring to FIGS. 2, 5, and 9A, in this embodiment, a first surface 42a of the mesh board 42 is disposed with a detection contact 425, a second surface 42b is disposed with a contact portion 423, and a contact through hole 426 is disposed between the first surface 42a and the second surface 42b and is electrically connected to the detection contact 425 and the contact portion 423. The detection contact 425 corresponds to the contact portion 423 and is connected to a second switch element 412, and when the second switch element 412 is not in contact with the detection contact 425, a loop protection program is started.

Figure 9E:
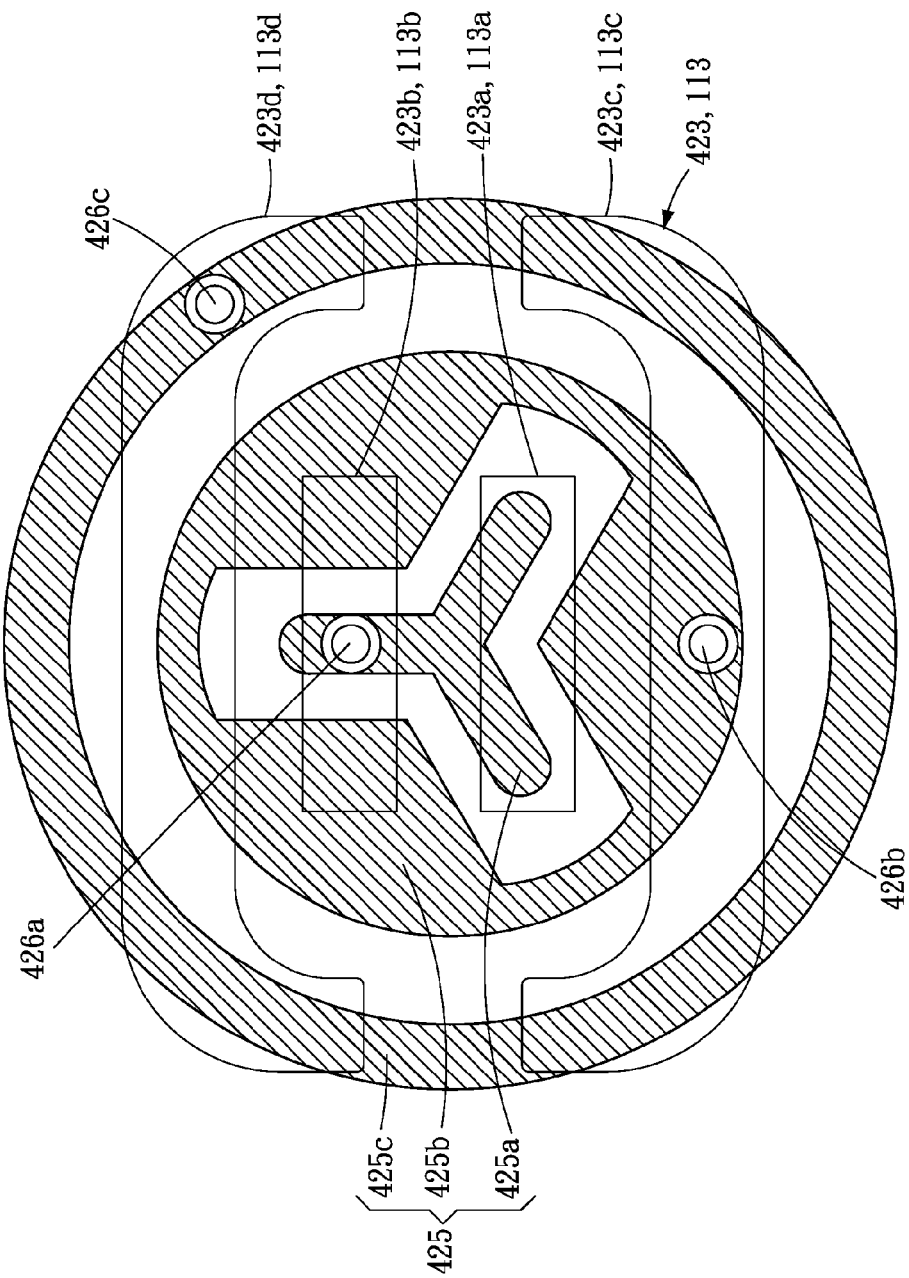
FIG. 9E is a partial top view of the present invention.
Figure 9F:
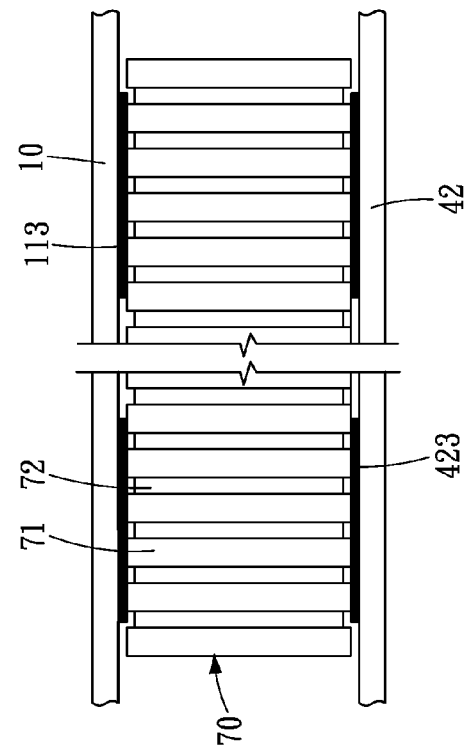
FIG. 9F is a schematic view (1) when a conduction element of the present invention is connected.
Figure 9G:
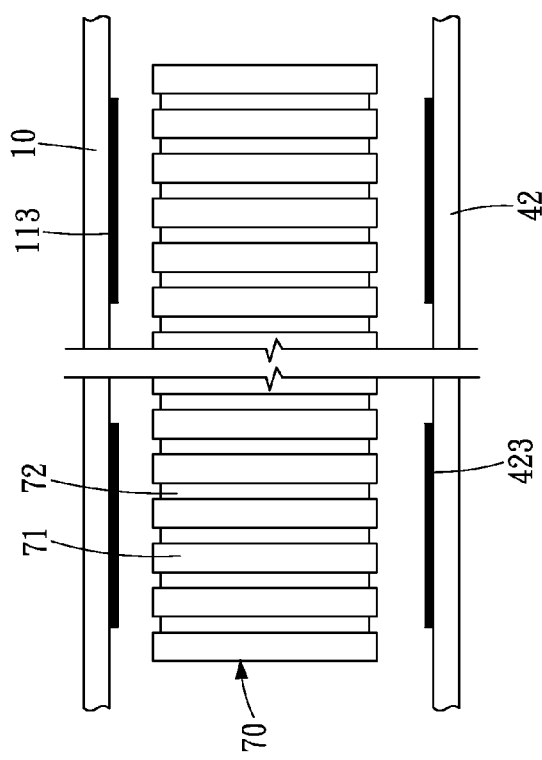
FIG. 9G is a schematic view (2) when a conduction element of the present invention is connected.

Referring to FIGS. 9A, 9B, and 9E, the detection contact 425 has a first contact 425a, a second contact 425b, and a third contact 425c separated from each other, the contact through hole 426 has a first conductive hole 426a, a second conductive hole 426b, and a third conductive hole 426c, and the contact portion 423 has a fourth connection point 423a, a fifth connection point 423b, a sixth connection point 423c, and a second ground connection point 423d. By using a winding line of the mesh board 42, the first conductive hole 426a is connected to the first contact 425a and the fifth connection point 423b, the second conductive hole 426b is connected to the second contact 425b and the sixth connection point 423c, and the third conductive hole 426c is connected to the third contact 425c and the second ground connection point 423d, so as to form respective independent loops.

Referring to FIGS. 2, 5, 9B, and 9D, in this embodiment, the third contact point 113 has 4 third contact points 113, where the 4 third contact points 113 separately have 4 first connection points 113a/113a'/113a''/113a''', and the second surface 42b is disposed with 4 contact portions 423, where the 4 contact portions 423 have 4 fourth connection points 423a/423a'/423a''/423a'''. In addition, the positions of the fourth connection point 423a and the fourth connection point 423a' are a diagonal line corresponding to the key 413, the positions of the fourth connection point 423a'' and the fourth connection point 423a''' are the other diagonal line corresponding to the key 413, and the two diagonal lines surpass the key 413 in an intersected manner to protect a whole area of the key 413. The first connection point 113a, the first connection point 113a', the first connection point 113a'', and the first connection point 113a''' are respectively connected to the fourth connection point 423a, the fourth connection point 423a', the fourth connection point 423a'', and the fourth connection point 423a''', so that the fourth connection point 423a is connected to the fourth connection point 423a', and the fourth connection point 423a" is connected to the fourth connection point 423a'". The first connection point 113a, the first connection point 113a', and the fourth connection point 423a are connected to the fourth connection point 423a' to form a first loop, and the first connection point 113a", the first connection point 113a'" and the fourth connection point 423a" are connected to the fourth connection point 423a'" to form a second loop, so as to form double loops. The fourth connection point 423a is connected to the first connection point 113a by using a first conduction element 70, the fourth connection point 423a' is connected to the first connection point 113a' by using the first conduction element 70, the fourth connection point 423a" is connected to the first connection point 113a" by using the first conduction element 70, and the fourth connection point 423a'" is connected to the first connection point 113a'" by using the first conduction element 70. The fourth connection point 423a is connected to the fourth connection point 423a' and the fourth connection point 423a" is connected to the fourth connection point 423a'" by an internal line of the mesh board 42. A set of internal detection points (which may be a detection point set by the microprocessor or a detection point connected to the substrate 10) exists between the first connection point 113a and the first connection point 113a' and between the first connection point 113a" and the first connection point 113a'". For example, the detection point 12a and the detection point 12b respectively detect whether the loop is in a conduction state, and if any conduction element 70 fails to be connected to the mesh board 42 and the substrate 10, an open circuit is formed and is detected by the detection point 12a or the detection point 12b.

Figure 4:
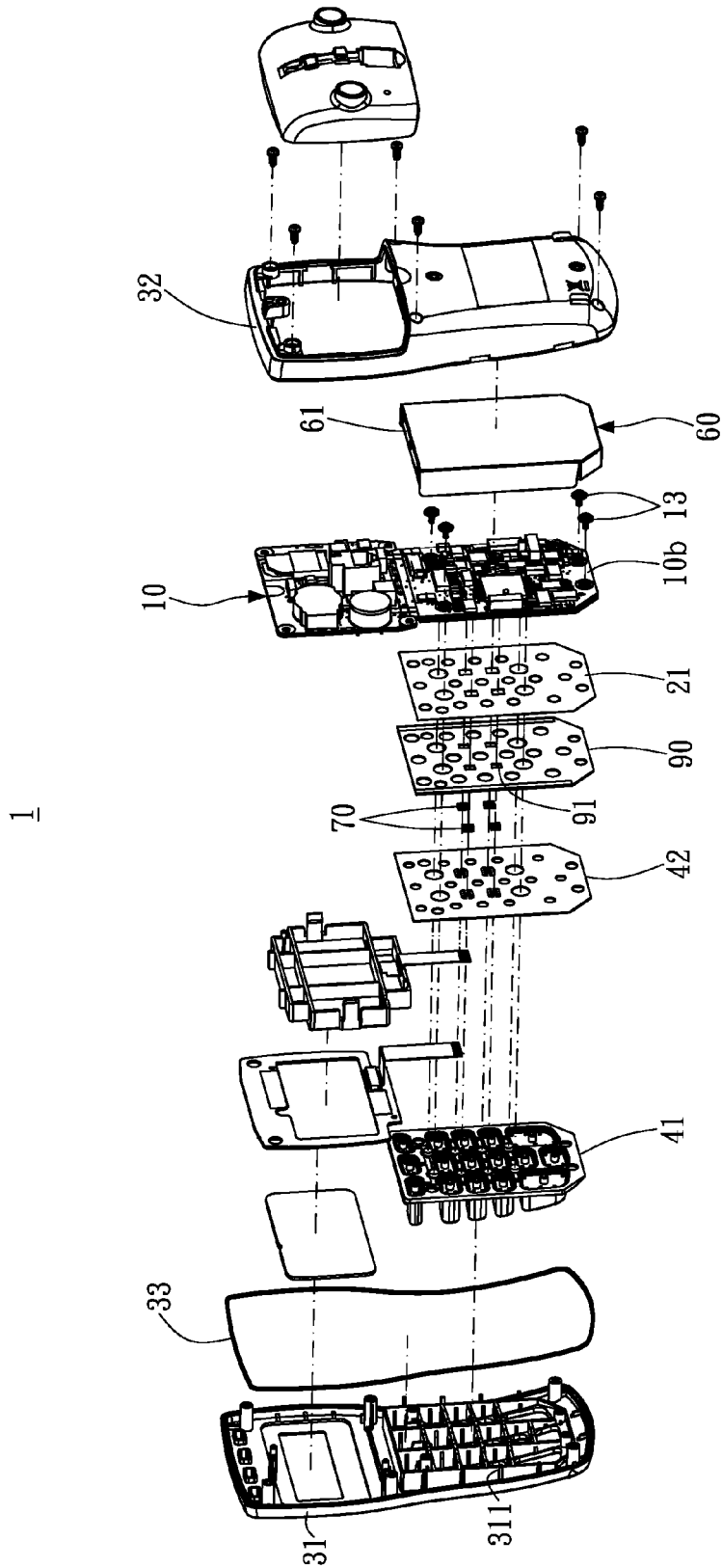
FIG. 4 is an exploded rear view of the present invention.

Referring to FIGS. 1 and 4, the first shell 31 is a long rectangular outer cover, providing a panel structure for used for operation and use. The material of the first shell 31 may be selected from ABS plastic, carbon fiber reinforced plastic (CFRP), super-elastic polycarbonate (SEPC), glass-fiber reinforced plastic (GFRP) or magnesium alloy. The foregoing structures and materials are only examples, but the present invention is not limited thereto. The first shell 31 covers the first surface 10a of the substrate 10.

Referring to FIGS. 1 and 4, in this embodiment, the first shell 31 and the substrate 10 are fixed by using a fastener 13, and the first shell 31 and the substrate 10 cover the first protection area 40 and are assembled into a semi-finished product. In addition, the first shell 31 is disposed with a display area and a plurality of key slot holes. In this embodiment, the first shell 31 has a plurality of catching grooves 311 located around the key slot holes. In this way, the structure of the first shell 31 has elements of the catching grooves 311 for a side plate 62 of the wire mesh 61 to be inserted and fixed, that is, the wire mesh 61 covers the first surface 10a of the substrate 10, and the wire mesh 61 surpasses the substrate 10 to surround the mesh board 42, the dividing sheet 90, and a side end of the key switch component for protection.

Referring to FIGS. 1, 2, 4, and 5, the first protection area 40 is located between the first surface 10a of the substrate 10 and the first shell 31. Herein, the first protection area 40 is formed between the operation board 41 and the substrate 10, and the mesh board 42 is provided between the operation board 41 and the substrate protection area 11. The operation board 41 is disposed at the first shell 31, a surface of the operation board 41 faces the substrate protection area 11, and the other surface of the operation board 41 has a plurality of numeric keys 413 for providing a user with a function of pressing the keys 413 to input a password.

Referring to FIGS. 2 and 5, in this embodiment, the operation board 41 may be a keyboard body, and the operation board 41 is formed by the first switch element 411, the second switch element 412, and the key 413. A disposing position of the first switch element 411 corresponds to a disposing position (that is, located at four endpoints of the operation board 41) of the first contact point 111 of the substrate 10. The second switch element 412 is located between the upper and lower first switch elements 411, and a disposing position of the second switch element 412 corresponds to a disposing position (that is, located at an approximately central position of the operation board 41) of the third contact point 113 of the substrate 10.

Referring to FIGS. 2 and 5, in this embodiment, the first switch element 411 and the second switch element 412 are conductive rubber. However, in some embodiments, the first switch element 411 and the second switch element 412 may be conductive tape. When the first switch element 411 and the second switch element 412 are projected at a same horizontal section, the length of the first switch element 411 is greater than that of the second switch element 412, that is, the length that the first switch element 411 extends towards the substrate 10 is greater than the length that the second switch element 412 extends towards the substrate 10 (as shown in FIG. 5). Because of the effect of an extension structure of the first switch element 411, the first switch element 411 may pass through the mesh board 42, the dividing sheet 90, and a hole of the key switch component 21 to be connected to the first contact point 111 of the substrate 10, and the second switch element 412 only needs to have a length structure of the detection contact 425 abutting the first surface 42a of the mesh board 42.

Referring to FIGS. 2, 5, 9H, and 9I, the first switch element 411 abuts the first contact point 111, and when the first switch element 411 is not in contact with the first contact point 111, a loop protection program is started. When the first switch element 411 is connected to the first induction point 111a and the second induction point 111b, a signal loop is closed and is in a conducted state. When the third induction point 111c is connected to the first induction point 111a or the second induction point 111b in a conduction manner, a microprocessor is driven to stop running and information in a memory is cleared. In addition, the second switch element 412 is a detection contact 425 in contact with the mesh board 42, and when the second switch element 412 is not in contact with the mesh board 42, the loop protection program is started.

Referring to FIGS. 2 and 5, the mesh board 42 is formed by a multilayer circuit board, which is a rigid PCB board, has effects of warp resistance and protection, and includes a plurality of winding loops connected serially, providing an effect of a secure line. That is, in this embodiment, the mesh board 42 has an electrical mesh layer 424 located at a surface of the mesh board 42. The mesh board 42 has a first surface 42a and second surface 42b opposite each other, the first surface 42a faces the operation board 41, and the second surface 42b faces the substrate 10. The mesh board 42 has a plurality of first perforations 421 and second perforations 422 in different sizes, the first perforation 421 correspondingly passes through the other end (that is, a bump 413a) of the key 413, and the second perforation 422 correspondingly passes through the first switch element 411, that is, the bump 413a of the other end of the key 413 is connected to the second contact point 112, and the first switch element 411 is connected to the first contact point 111.

Referring to FIGS. 2 and 5, an aperture diameter D2 of the first perforation 421 conforms to an external diameter of the bump 413a stretching behind the key 413, so that the bump 413a passes through the first perforation 421, so as to prevent the bump 413a from being extracted by a hacker. The aperture diameter D2 of the first perforation 421 is less than an external diameter of the spring 211 of the key switch component 21. An aperture diameter D1 of the second perforation 422 only allows the first switch element 411 to pass through, but the first induction point 111a and the second induction point 111b of the first contact point 111 cannot be exposed at the same time, so as to prevent lapping (also referring to FIG. 9H).

Referring to FIGS. 9H and 9I, when the second switch element 412 is connected to the first contact 425a and the second contact 425b, a signal loop is in a conduction state, and if any loop is an open circuit, the microprocessor is driven to stop running and information in the memory is cleared. In this embodiment, when the third contact 425c is connected to the first contact 425a or the second contact 425b in a conduction manner, the microprocessor is driven to stop running and information in the memory is cleared.

In addition, the first contact 425a and the second contact 425b form two independent loops A and B (a positive signal and a negative signal), and the third contact 425c forms a ground loop C (a ground signal). In this embodiment, when the detection contact 425 is applied with conductive materials (for example, conductive liquid) and is lapped, the third contact 425c is short-circuited with loops of the first contact 425a and the second contact 425b, so that the microprocessor stops running.

Referring to FIGS. 2, 5, 9A, and 9B, the mesh board 42 is located between the operation board 41 and the substrate protection area 11. In addition, a disposing position of the contact portion 423 of the mesh board 42 corresponds to a disposing position of the third contact point 113 of the substrate protection area 11. In this embodiment, the conduction element 70 enables vertical conduction between the third contact point 113 and the contact portion 423, and when the conduction element 70 fails conduction between the third contact point 113 and the contact portion 423, the loop protection program is started. The mesh board 42 is in contact with the substrate protection area 11, and when the mesh board 42 is not in contact with the substrate protection area 11, the signal loop of the loop protection program is driven to be broken. The detection contact 425 is protected by the second switch element 412, and a rear (that is, facing the first surface 10a of the substrate 11) signal through hole of the contact portion 423 is also protected, so as to prevent lapping attack from a front side (that is, facing a rear side of the operation board 41).

Referring to FIGS. 9A and 9B, in this embodiment, the third contact point 113 includes a first connection point 113a, a second connection point 113b, a third connection point 113c, and a first ground connection point 113d, which respectively correspond to a fourth connection point 423a, a fifth connection point 423b, a sixth connection point 423c, and a second ground connection point 423d of the contact portion 423. When the conduction element 70 is connected to the first connection point 113a and the fourth connection point 423a, the second connection point 113b and the fifth connection point 423b, and the third connection point 113c and the sixth connection point 423c, signal loops are in a conduction state, and if any loop is an open circuit, or contacts between any two loops are short-circuited, the microprocessor is driven to stop running and information in the memory is cleared.

Referring to FIGS. 9A, 9B, and 9E, FIG. 9E indicates corresponding positions after the contact portion 423, the third contact point 113, and the detection contact 425 are vertically projected. In this embodiment, the third contact point 113 is electrically connected to the first contact 425a and the second contact 425b of the detection contact 425, where a first conductive hole 426a and a second conductive hole 426b of the contact through hole 426 are connected. Herein, when any two loops of the first connection point 113a and the first contact 425a, the second connection point 113b and the second contact 425b, and the third connection point 113c and the third contact 425c are short-circuited, the microprocessor is driven to stop running and information in the memory is cleared.

Referring to FIGS. 1, 3, 4, and 6, the second shell 32 is a long rectangular outer cover, which confirms to the first shell 31 in length and width and is combined with the first shell 31. In this embodiment, the first shell 31 includes a washer 33, located at the periphery of the second shell 32 and the first shell 31, and the washer 33 is positioned at the periphery aligned with the substrate 10, so as to provide an effect of preventing adhesive overflowing. Herein, the second shell 32 is located at the second surface 10b of the substrate 10 and is combined with the first shell 31, the second shell 32 is formed by the groove 321 and the feed inlet 322 that are connected, the groove 321 corresponds to the electronic element area 12, and the feed inlet 322 corresponds to an outer side of the electronic element area 12 (that is, an outer side of the wire mesh 61 of the second protection area 60).

Referring to FIGS. 3 and 6, the second protection area 60 is located at the groove 321 of the second shell 32, that is, the second protection area 60 is located between the substrate 10 and the second shell 32. In this embodiment, the second protection area 60 includes a wire mesh 61, where the wire mesh 61 is formed by a flexible circuit board, which includes a plurality of winding loops connected serially, providing an effect of a secure line. The wire mesh 61 surrounds the electronic element area 12 and is electrically connected to the substrate 10. The wire mesh 61 includes a feeding hole 611 and a connection port 612, where the feeding hole 611 corresponds to a part of the feed inlet 322, and therefore, an adhesive may be filled inside the feeding hole 611 (that is, the inside of the wire mesh 61 and the electronic element) from the feed inlet 322, and filled between the wire mesh 61 and the second shell 32, so as to be fixedly adhering the wire mesh 61, an electronic element on the second surface 10b of the substrate 11, the first shell 31, and the second shell 32.

Referring to FIGS. 3 and 6, the connection port 612 of the wire mesh 61 may be connected to the connector 121 of the electronic element area 12. In addition, the wire mesh 61 includes a plurality of side plates 62, and a corner 621 of each side plate 62 includes an overlapped section 63 (as shown in FIG. 3, to clearly indicate an overlapped position, a part of a winding line is removed). That is, two side plates 62 are overlapped at the corner 621, thereby increasing a protection effect. In this embodiment, the side plate 62 around the wire mesh 61 may be inserted into a plurality of catching grooves 311 of the first shell 31 (as shown in FIGS. 3 and 4), so that the wire mesh 61 covers the first surface 10a of the substrate 10.

Referring to FIGS. 3, 6, 7, and 8, the material of the adhesive piece 80 may be epoxy, but the present invention is not limited thereto. The adhesive piece 80 is filled into the feed inlet 322 to cover the groove 321, and fixes the wire mesh 61, the electronic element area 12, the first shell 31, and the second shell 32. The adhesive piece 80 covers a surrounding area of the wire mesh 61, and when the first shell 31 or the second shell 32 is intruded or damaged by an external force, the adhesive piece 80 and the wire mesh 61 are touched (for example, the wire mesh 61 is damaged by an improper force), and the plurality of winding loops of the wire mesh 61 breaks or contacts with each other, so as to drive the signal loop of the loop protection program to be broken or short-circuited. The adhesive piece 80 is a high rigidness and high temperature resistant material, and can be fixedly adhered to a line of the wire mesh 61, so that when the line of the wire mesh 61 is excavated by an external force, the line of the wire mesh 61 is easily damaged, causing a short circuit or a broken circuit.

Referring to FIGS. 2 and 5, the electronic device 1 of the board protection mechanism further includes a dividing sheet 90. Herein, the dividing sheet 90 may be an acrylic board or an insulation film (such as a polyester film). The dividing sheet 90 is located between the mesh board 42 and the substrate 10, two surfaces of the dividing sheet 90 are separately adhered to the key switch component 21 and the mesh board 42 that are located on the substrate 10, and the dividing sheet 90 has a positioning portion 91. In this embodiment, the positioning portion 91 forms a penetrating hole structure, and is disposed with a conduction element 70, and a disposing position of the positioning portion 91 is a disposing position corresponding to the contact portion 423 and the third contact point 113.

Referring to FIGS. 9A, 9B, 9F, and 9G, in this embodiment, the conduction element 70 is conductive rubber. However, in some embodiments, the conduction element 70 may be vertical conductive tape, where the conductive rubber has a cushion material, and the conductive tape does not have a cushion material. In addition, the conduction element 70 is located between the substrate 10 and the mesh board 42, and the conduction element 70 is vertically connected between the third contact point 113 and the contact portion 423, and enables conduction between the third contact point 113 and the contact portion 423. In addition, when the conduction element 70 fails conduction between the third contact point 113 and the contact portion 423, a loop protection program is started, that is, a microprocessor is driven to stop running and information in the memory is cleared. Herein, when the conduction element 70 is conductive rubber, the conduction element 70 includes a plurality of conductive ends 71 and a plurality of cushion ends 72 that are independently and separately arranged. In this embodiment, the cushion end 72 is an insulation material. The plurality of conductive ends 71 is a conductive material (which may be a metal material or a carbon conductive material), and the conductive end 71 is separately connected to the third contact point 113 and the contact portion 423, that is, when the conduction element 70 loses contact with the third contact point 113 or the contact portion 423, the signal loop is an open circuit and enters a state without conduction.

In this embodiment, the electronic device 1 may be applied as a multifunction password keyboard, which may be a card reader used for credit cards, access control cards, or the like. The foregoing multifunction password keyboard may further include a printing device (not shown) to print a slip for a consumer. The multifunction password keyboard has a function of protecting data from improper reading, thereby preventing data leakage.

According to the above, the electronic device of the board protection mechanism of the present invention can be applied to various card readers, and by using such a structural design of a board (that is, a structure of a single substrate), an adhesive piece and a wire mesh of a second protection area cover a rear end of a substrate, so as to achieve a difference from a problem of increased cost in using a double-layer board for a protective design and provide an effect of cost reduction. In addition, when an electronic device of a board protection mechanism is damaged by an improper external force, it can be ensured that data stored in the electronic device is not stolen.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electronic device of a board protection mechanism, comprising:
   a substrate, comprising a first surface and a second surface, wherein the first surface comprises a substrate protection area, and the second surface comprises an electronic element area;
   a first shell, located at the first surface of the substrate;
   a first protection area, located between the first surface of the substrate and the first shell, comprising:
   an operation board, located at the first shell, wherein the operation board is in contact with the substrate protection area, and when the operation board is not in contact with the substrate protection area, a signal loop of a loop protection program is driven to be broken or short-circuited; and
   a mesh board, located between the operation board and the substrate protection area, wherein the mesh board is in contact with the substrate protection area, and when the mesh board is not in contact with the substrate protection area, the signal loop of the loop protection program is driven to be broken or short-circuited;
   a second shell, located at the second surface of the substrate and combined with the first shell, wherein the second shell comprises a groove and a feed inlet that are connected, the groove corresponds to the electronic element area, and the feed inlet corresponds to an outer side of the electronic element area;
   a second protection area, located at the groove of the second shell, wherein the second protection area comprises a wire mesh, surrounding the electronic element area and electrically connected to the substrate; and
   an adhesive piece, filled into the feed inlet to cover the groove, wherein the adhesive piece is fixed to the first shell, the second shell, the wire mesh, and the electronic element area, and when the first shell or the second shell is intruded or damaged by an external force, the adhesive piece and the wire mesh are touched to drive the signal loop of the loop protection program to be broken or short-circuited.

2. The electronic device of a board protection mechanism according to claim 1, wherein the wire mesh of the second protection area comprises a feeding hole corresponding to a part of the feed inlet.

3. The electronic device of a board protection mechanism according to claim 1, wherein the wire mesh of the second protection area comprises a plurality of side plates, and an overlapped section is comprised at a corner of the side plates.

4. The electronic device of a board protection mechanism according to claim 1, wherein the first shell comprises a plurality of catching grooves, located around a slot hole of a key, the wire mesh of the second protection area is inserted and fixed to the catching grooves, the wire mesh covers the first surface of the substrate, and the wire mesh surpasses the substrate to surround a side end of the mesh board.

5. The electronic device of a board protection mechanism according to claim 1, wherein the electronic element area of the substrate comprises a connector, and the wire mesh of the second protection area comprises a connection port connected to the connector.

6. The electronic device of a board protection mechanism according to claim 1, wherein the substrate protection area comprises a first contact point, the operation board comprises a first switch element pressing the first contact point, and when the first switch element is not in contact with the first contact point, the loop protection program is started.

7. The electronic device of a board protection mechanism according to claim 6, wherein the operation board comprises a plurality of keys, and the first contact point is located around the numeric keys.

8. The electronic device of a board protection mechanism according to claim 1, wherein the substrate protection area comprises a second contact point, having an outer guide point and an inner guide point separated from each other, the outer guide point is in contact with an outer edge of a spring of a key switch component, the operation board comprises a key, and when the key is pressed, an inner edge of the spring is in contact with the inner guide point of the second contact point.

9. The electronic device of a board protection mechanism according to claim 8, wherein the mesh board comprises a first perforation, penetrating another end of the key and connected to the second contact point.

10. The electronic device of a board protection mechanism according to claim 9, wherein the mesh board comprises a second perforation, and the operation board comprises a first switch element, penetrating the second perforation and connected to the substrate protection area.

11. The electronic device of a board protection mechanism according to claim 1, wherein the substrate protection area comprises a third contact point, a surface of the mesh board comprises a contact portion disposed corresponding to the third contact point, a conduction element is used to enable vertical conduction between the third contact point and the contact portion, and when the conduction element fails conduction between the third contact point and the contact portion, the loop protection program is started.

12. The electronic device of a board protection mechanism according to claim 11, wherein the third contact point comprises a first connection point, a second connection point, a third connection point, and a first ground connection point, and the contact portion comprises a fourth connection point, a fifth connection point, a sixth connection point, and a second ground connection point, when the conduction element is connected to the first connection point and the fourth connection point, the second connection point and the fifth connection point, the third connection point and the sixth connection point, and the first ground connection point and the second ground connection point, signal loops are in a conduction state, and if any loop is an open circuit, a microprocessor is driven to stop running and information in a memory is cleared.

13. The electronic device of a board protection mechanism according to claim 12, wherein when the third connection point and the sixth connection point or the first ground connection point and the second ground connection point are respectively connected to the first connection point and the fourth connection point or the second connection point and the fifth connection point in a conduction manner, the microprocessor is driven to stop running and information in the memory is cleared.

14. The electronic device of a board protection mechanism according to claim 11, further comprising a dividing sheet, located between the mesh board and the substrate, wherein the dividing sheet comprises a positioning portion, penetrating the conduction element.

15. The electronic device of a board protection mechanism according to claim 1, wherein the mesh board comprises an electrical mesh layer located at a surface of the mesh board.

16. An electronic device of a board protection mechanism, comprising:

a substrate, comprising a first surface and a second surface, wherein the first surface comprises a substrate protection area, and the second surface comprises an electronic element area;

a first shell, located at the first surface of the substrate;

a first protection area, located between the first surface of the substrate and the first shell, comprising:

an operation board, located at the first shell, wherein the operation board is in contact with the substrate protection area, and when the operation board is not in contact with the substrate protection area, a signal loop of a loop protection program is driven to be broken or short-circuited;

a mesh board, located between the operation board and the substrate protection area, wherein the mesh board is in contact with the substrate protection area, and when the mesh board is not in contact with the substrate protection area, the signal loop of the loop protection program is driven to be broken or short-circuited;

a detection contact, located at a surface of the mesh board and comprising a first contact, a second contact, and a third contact separated from each other;

a contact portion, located at the other surface of the mesh board and comprising a fourth connection point, a fifth connection point, a sixth connection point, and a second ground connection point; and a plurality of contact through holes, located at the mesh board and connected to the first contact and the fifth connection point, the second contact and the sixth connection point, and the third contact and the second ground connection point;

a second shell, located at the second surface of the substrate and combined with the first shell, wherein the second shell comprises a groove and a feed inlet that are connected, the groove corresponds to the electronic element area, and the feed inlet corresponds to an outer side of the electronic element area;

a second protection area, located at the groove of the second shell, wherein the second protection area comprises a wire mesh, surrounding the electronic element area and electrically connected to the substrate; and an adhesive piece, filled into the feed inlet to cover the groove, wherein the adhesive piece is fixed to the first shell, the second shell, the wire mesh, and the electronic element area, and when the first shell or the second shell is intruded or damaged by an external force, the adhesive piece and the wire mesh are touched to drive the signal loop of the loop protection program to be broken or short-circuited.

17. The electronic device of a board protection mechanism according to claim 16, wherein the contact through holes comprise a first conductive hole, a second conductive hole, and a third conductive hole, wherein the first conductive hole is connected to the first contact and the fifth connection point, the second conductive hole is connected to the second contact and the sixth connection point, and the third conductive hole is connected to the third contact and the second ground connection point, so as to form respective independent loops.

18. The electronic device of a board protection mechanism according to claim 16, wherein the operation board comprises a second switch element, the detection contact of the mesh board corresponds to the contact portion and is connected to the second switch element, and when the second switch element is not in contact with the detection contact, the loop protection program is started.

19. The electronic device of a board protection mechanism according to claim 18, wherein when the second switch element is connected to the first contact and the second contact, the signal loop is in a conduction state, and if any loop is an open circuit, a microprocessor is driven to stop running and information in a memory is cleared.

20. The electronic device of a board protection mechanism according to claim 16, wherein when the third contact is connected to the first contact or the second contact in a conduction manner, a microprocessor is driven to stop running and information in a memory is cleared.

\* \* \* \* \*